CRYOGENIC MEMORY SYSTEM WITH INTERNAL INFORMATION EXCHANGE

Original Filed May 18, 1960 4 Sheets-Sheet 1

INVENTOR.
MUNRO K. HAYNES

BY
Thomas & Crickenberger

CRYOGENIC MEMORY SYSTEM WITH INTERNAL INFORMATION EXCHANGE

Original Filed May 18, 1960 4 Sheets-Sheet 2

CRYOGENIC MEMORY SYSTEM WITH INTERNAL INFORMATION EXCHANGE

Original Filed May 18, 1960 4 Sheets-Sheet 3

CRYOGENIC MEMORY SYSTEM WITH INTERNAL INFORMATION EXCHANGE

Original Filed May 18, 1960 4 Sheets-Sheet 4

United States Patent Office

Re. 26,436
Reissued Aug. 6, 1968

26,436

CRYOGENIC MEMORY SYSTEM WITH INTERNAL INFORMATION EXCHANGE

Munro K. Haynes, Chappaqua, N.Y., assignor to International Business Machines Corporation, New York, N.Y., a corporation of New York Original No. 3,170,144, dated Feb. 16, 1965, Ser. No. 29,899, May 18, 1960. Application for reissue May 27, 1965, Ser. No. 460,618

16 Claims. (Cl. 340—173.1)

Matter enclosed in heavy brackets [ ] appears in the original patent but forms no part of this reissue specification; matter printed in italics indicates the additions made by reissue.

*ABSTRACT OF THE DISCLOSURE*

*A memory device which includes rows of registers, each register having a plurality of storage positions formed from superconductive persistent current loops, corresponding storage positions in the registers forming columns in an array configuration. Cryotron elements are employed to control the information currents in the system, the presence or absence of currents in storage position loops providing indications of stored binary data. Information in one register may be interchanged with information in another register without requiring a data transfer to a device external to the memory. The invention is adaptably implemented by numerous types of bistable storage devices, cryotrons and other cryogenic components being particularly advantageously employed.*

This invention relates to memory devices and more particularly to such devices wherein information stored in one register may be exchanged or swapped for the information held in another register.

In certain types of computing systems utilizing a central memory device it is possible to perform an exchange or swap instruction. This instruction transfers information from a first register in one part of the memory device to a second register in another part of the memory device, and information in the second register is transferred to the first register. This instruction also may be used to exchange or swap information in one group of registers for the information in another group of registers. The exchange or swap instruction requires that the information be read from the memory to an external storage device where it is temporarily retained while the word it is to replace is being read from the memory device. The two words are then written back into the memory device during successive memory cycles to the appropriate locations for the exchange or swap operation. In exchanging two words in this fashion it is readily seen that four memory cycles may be involved. Two of the memory cycles are required to extract the two words and two of the memory cycles are required to store the two words. This involves a relatively long period of time, and the external storage equipment may involve in some instances an increase in the cost of manufacture of the computing device.

In order to overcome or alleviate some of the foregoing difficulties, this invention provides a memory device where information may be exchanged or swapped between registers within the memory device, thereby minimizing the time involved in the interchange of information and in some instances reducing the need for auxiliary equipment external to the memory device.

In one arrangement according to this invention information is stored in a memory device which includes a plurality of reigsters arranged to form the rows in an array configuration. Each register has a plurality of storage positions formed from superconductive persistent current loops. Corresponding storage positions in the registers make up the columns in the array configuration.

Cryotron elements are used to control the information currents in the system, and the presence or absence of currents in the storage position loops provides indications of the binary data stored. The information in a selected register may be interchanged with the information of another selected register without requiring a data transfer to a device external to the memory.

The flexible memory device of this invention may take many forms in practice. It is adaptable to numerous types of bistable storage devices, and it is especially suitable for use with cryotrons and other cryogenic devices. The invention is illustrated herein with the use of cryotrons, but it is to be understood that the invention is not limited to cryotrons or cryogenic devices since other types of bistable storage devices may be equally well employed.

The foregoing and other features of this invention may be more fully appreciated when considered in the light of the following specification and the drawings in which.

Figure 1:
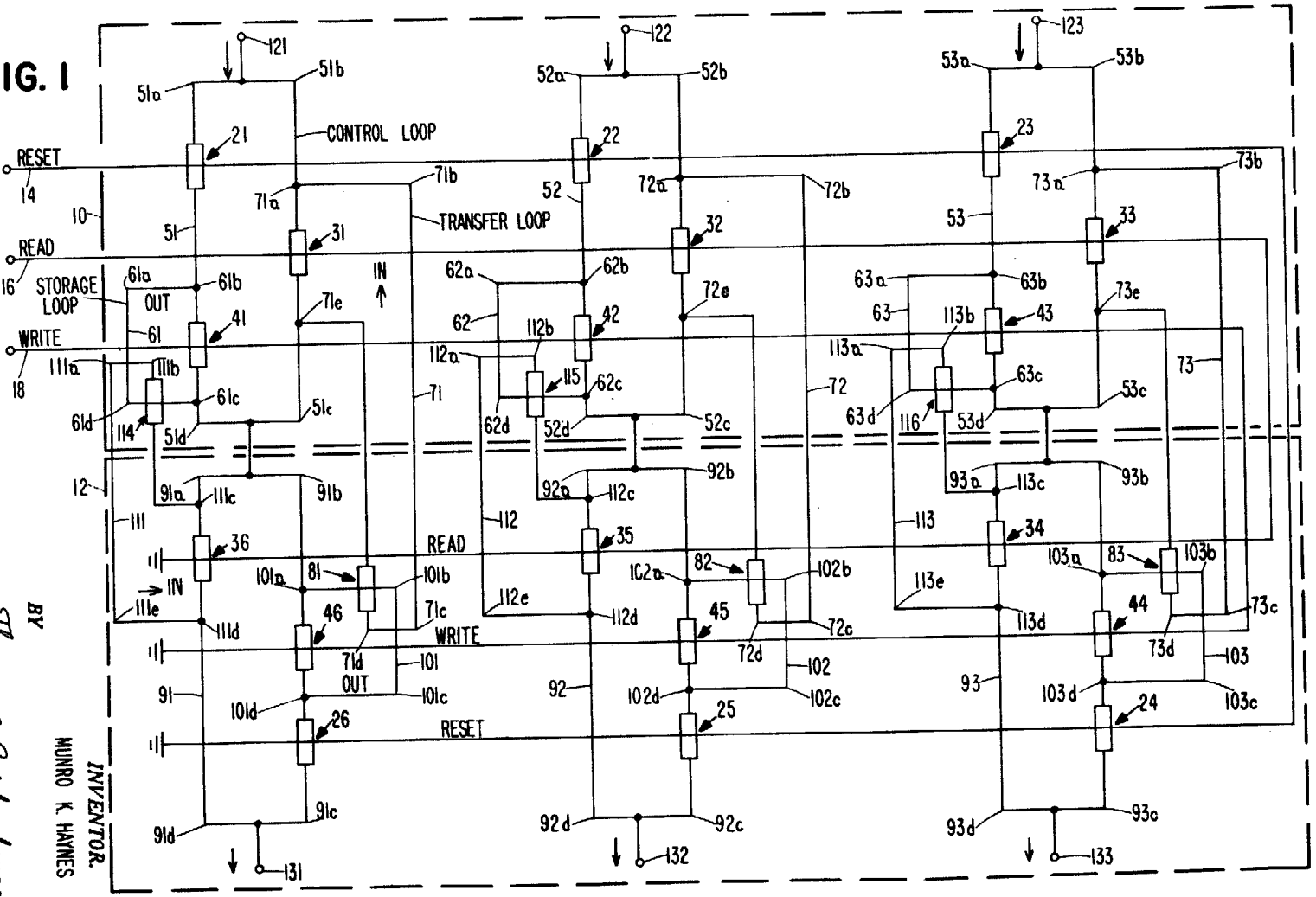
FIG. 1 illustrates one arrangement of a memory device constructed according to this invention.

Referring first to FIG. 1, registers 10 and 12 are interconnected as shown to perform the register exchange function. Lines 14, 16 and 18 are energized with currents during respective reset, read and write operations. When the reset line 14 is energized with a current, the gates of cryotrons 21 through 26 are driven resistive. When the read line 16 is energized with a current, the gates of cryotrons 31 through 36 are driven resistive. When the write line 18 is energized with a current, the gates of cryotrons 41 through 46 are driven resistive.

The register 10 in FIG. 1 includes control loops 51 through 53. Each of these control loops is defined by the letters a, b, c and d associated with the loop number. The control loops 51 through 53 include respective storage loops 61 through 63 associated therewith. Each of these storage loops is defined by the points a, b, c and d associated with the loop number. The control loops 51 through 53 of the register 10 include respective sense loops 71 through 73 associated therewith. Each of the sense loops is defined by the points a, b, c, d and e associated with the loop number. The sense loops 71 through 73 include respective cryotrons 81 through 83 disposed therein.

Register 12 has control loops 91 through 93 associated with respective storage loops 101 through 103. Each of these loops is defined by three points a, b, c and d associated with the loop number. The control loops 91 through 93 of register 2 include sense loops 111 through 113 defined by the points a, b, c, d and e with the loop number. The sense loops 111 through 113 include respective cryotrons 114 through 116 therein. The control loops 91 through 93 of the register 12 may be connected in series with respective control loops 51 through 53 of the register 10. Currents are supplied to the control loops 51 through 53 through respective input terminals 121 through 123 in register 10, and these currents may pass through associated control loops 91 through 93 in the register 12 and exit through associated terminals 131 through 133, or equivalent currents may be supplied independently.

Signals representative or binary information are established in storage loops 61 through 63 of register 10. The signals are stored as persistent currents, and the presence of a persistent current is arbitrarily assumed to represent a binary one. The absence of a persistent current is arbitrarily assumed to represent a binary zero. Information is represented in like fashion in the register 12 by the presence or absence of a persistent current in the storage loops 101 through 103.

Figure 2:
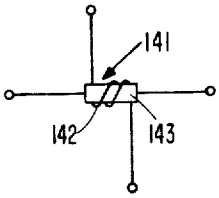
FIG. 2 illustrates a cryotron in schematic form.
Figure 3:
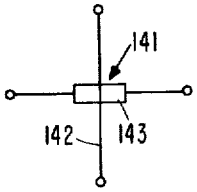
FIG. 3 is a symbol employed throughout FIGS. 1 and 4 through 6 to represent the cryotron illustrated schematically in FIG. 1.

Referring next to FIG. 2, a cryotron 141 is illustrated as having a winding 142 disposed about a gate element 143. While this cryotron is represented as a conventional wire-wound cryotron in the interest of providing a more graphic circuit illustration, it is to be understood that the cryotron may be constructed of thin film devices of the type shown and described in copending application Serial No. 625,512, filed on November 30, 1956, by R. L. Garwin and assigned to the assignee of this invention. The circuit schematic of the cryotron 141 in FIG. 2 is depicted in FIG. 3 in a more simplified form. The same reference numerals employed in FIG. 2 are used in FIG. 3 to designate corresponding parts. The winding 142 in FIG. 2 is represented in FIG. 3 by the vertical conductor 142 disposed across the gate element 143. The simplified legend of FIG. 3 is employed in FIGS. 1, 4, 5 and 6 to represent cryotrons such as illustrated in FIG. 2.

The circuits of this invention are operated at low temperature such as by immersion in liquid helium. The circuit lines or wires and the control coils of each cryotron are made of a hard superconductor such as niobium, and the gate element of each cryotron is made of a soft superconductor such as tantalum. The currents employed create magnetic field in the control coil which exceeds the critical field of the gate, but the magnetic field does not exceed the critical field of the control coil or the connecting lines or wires. Accordingly, the gate element of the cryotron is driven resistive when current flows in the control coil of the cryotron, and the gate element is superconductive when no current flows in the control coil, or when a current of magnitude less than critical current of the gate flows in the control coil.

Figure 4:
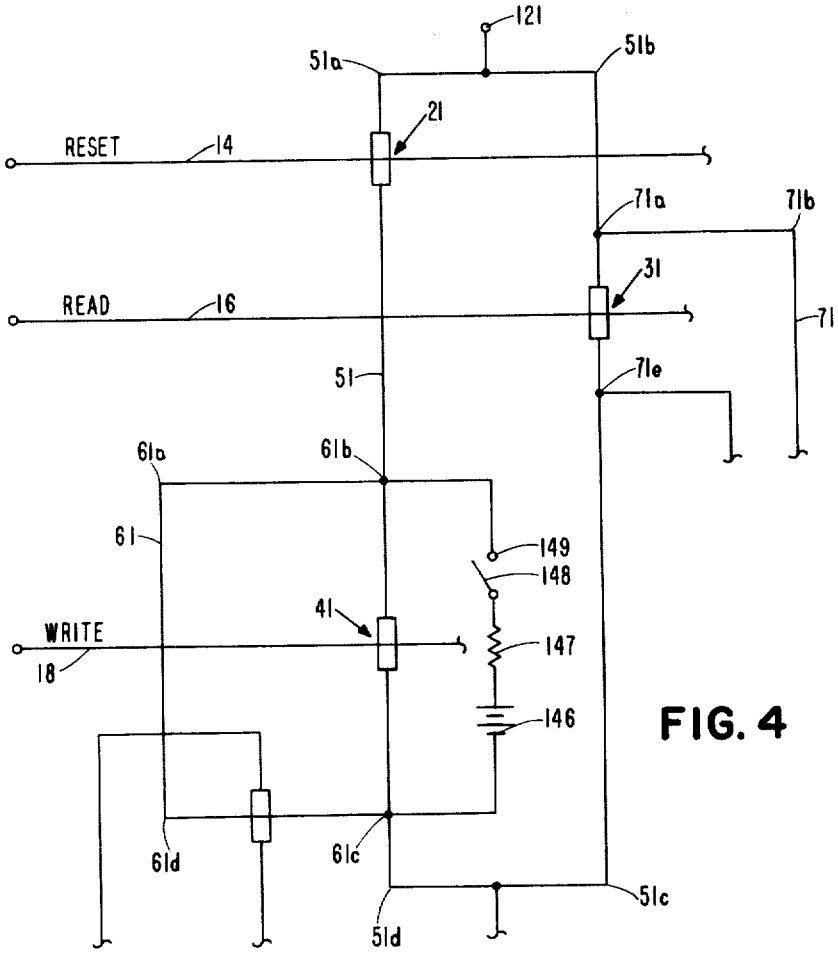
FIG. 4 illustrates in greater detail a portion of the circuit arrangement in FIG. 1.

In order to illustrate one way in which persistent currents may be established in the storage loops of the registers 10 and 12 in FIG. 1, the storage loop 61 in register 10 is selected, and it is illustrated in FIG. 4 with a circuit for establishing a persistent current or the absence of a persistent current therein. The circuit for controlling the establishment of a persistent current in the storage loop 61 includes a battery 146, a resistor 147 and a switch 148 connected as shown. A contact 149 of the switch 148 is connected to the point 61b of the storage loop 61, and one side of the battery 146 is connected to the point 61c of the storage loop 61. The switch 148 is illustrated as a mechanical switch, but it may be an electrical or electronic device in practice. The switch 148 is closed to represent a binary one, and it is opened to represent a binary zero.

Whenever a binary zero is to be represented by the storage loop 61, no persistent current is established therein. To insure that no persistent current is established in the storage loop 61 the switch 148 is opened, and the wire line 18 is energized with a current. This drives the gate of the cryotron 41 resistive and dissipates any current which may have been circulating in the storage loop 61. During the period that a writing operation takes place in the storage loop 61, current to the terminal 121 of the control loop 51 may be terminated, or if current is flowing into the loop 51 from the terminal 121, the reset line 14 is energized and this drives the gate of the cryotron 21 resistive and diverts current from the terminal 121 to the leg 51b, 51c of the control loop 51. By diverting the current from the terminal 121 away from the leg 51a, 51d of the control loop 51, this current does not interfere with the writing operation taking place in the storage loop 61.

In order to represent a binary one in the storage loop 61, a persistent current must be established therein. To accomplish this the write line 18 is energized, driving the gate of the cryotron 41 resistive, and the switch 148 is closed causing the battery current to flow to the storage loop 61 by entering at the point 61b and traveling that portion of the loop 61 defined by the points b, a, d and c associated with the loop number. From the point 61c current flows to the other opposite terminal of the battery. Next, the current applied to the write line 18 is terminated, and upon such termination the switch 148 may be opened. The electrical energy stored in that portion of the inductance of the storage loop 61 defined by the points b, a, d and c associated with the loop causes a current to circulate in the storage loop 61 and persists as long as the storage loop 61 remains superconductive. It is seen therefore that a persistent current has been established in the loop 61 which represents a binary one.

In order to illustrate the exchange or swap operation in FIG. 1, let it be assumed that the register 10 holds the binary word 101 in respective storage loops 61 through 63 and that register 12 holds the binary word 110 in respective storage loops 101 through 103. First, currents are applied to the terminals 121 through 123 of register 10, and these currents are maintained throughout the exchange or swap operation. Next, the reset line 14 is energized with a current pulse, and this drives resistive the gates of the cryotrons 21 through 23 of register 10 and 24 through 26 of register 12. Current from the terminal 121 in register 1 is diverted to that platform of the control loop 51 defined by the points 51b and 51c, and the current is diverted through that portion of the control loop 91 in register 12 defined by the points 91a and 91d. The current then exits through the terminal 131. Current from the terminal 122 in register 10 is diverted through the right-hand portion of the control loop 52 defined by the points 52b and 52c, and this current is diverted through the left-hand portion of the control loop 92 in register 12 defined by the points 92a and 92d. From the point 92d the current exits through the terminal 132. Current to the terminal 123 in register 10 is diverted through the right-hand portion of the control loop 53 defined by the points 53b and 53c, and it is diverted through the left-hand portion of the control loop 93 defined by the points 93a and 93d. From the point 93d the current exits through the terminal 133. When the currents have been thus diverted, the current on the reset line 14 is terminated.

Next, the read line 16 is energized wtih a current, and the gates of the cryotrons 31 through 33 in register 10 and 34 through 36 of register 12 are driven resistive. In the control loop 51 of register 10, the gate of the cryotron 81, associated with the storage loop 101 in register 12, is driven resistive by the persistent current in the storage loop 101. The gate of the cryotron 31 in the control loop 51 is driven resistive by the current in the read line 16. Consequently, current from the terminal 121 is diverted from the right-hand portion of the control loop 51, and it flows in the left-hand portion of the control loop 51 defined by the points 51a and 51d. From the point 51d the current enters the control loop 91 in register 12. In the control loop 91, the gate of the cryotron 114 in the sense loop 111 is driven resistive by the persistent current in the storage loop 61 of register 10. The gate of the cryotron 36 in the control loop 91 is driven resistive by the current on the read line 16. Consequently, current is diverted from the left-hand portion of the control loop 91 to the right-hand portion defined by the points 91b and 91c. From the point 91c current flows to the exit terminal 131.

In the control loops 52 and 92, the persistent current in the storage loop 102 of register 12 drives the gate of the cryotron 82 in the sense loop 72 resistive. The current on the read line 16 drives the gate of the cryotron 32 resistive. Consequently, current from the terminal 122 is diverted from the right-hand portion of the control loop 52 to the left-hand portion defined by the points 52a and 52d. From the point 52d the current flows to the control loop 92. The gate of the cryotron 115 is superconductive because no current is circulating in the storage loop 62 of register 10. The gate of the cryotron 35 is driven resistive by the current on the read line 16, and current flowing into the left-hand portion of the control loop 92 flows through the path defined by the points 92a, 112c, 112d, 112a, 112e, 112d and 92d. From the point 92d the current exits through the terminal 132.

Considering next what happens in the control loops 53 and 93, the gate of the cryotron 83 in the sense loop 73 remains superconductive because no current is circulating in the storage loop 103 of register 12. The gate of the cryotron 33 is driven resistive by the current on the read line 16, and current flowing in the right-hand portion of the control loop 53 is diverted at the point 73a through the path defined by the points 73a, 73b, 73c, 73d, 73e and 53c. From the point 53c current flows to the control loop 93. The gate of the cryotron 116 in the sense loop 113 is driven resistive by the circulating current in the storage loop 63 of register 10. The gate of the cryotron 34 is driven resistive by the current on the read line 16. Consequently, current is diverted from the left-hand portion of the control loop 93 in register 12 to the right-hand portion defined by the points 93b and 93c. From the point 93c current flows to the exit terminal 133. At this point current on the read line 16 may be terminated.

As a result of the foregoing read operation currents in various ones of the control loops are flowing to various ones of the storage loops. In some instances no current is supplied to given storage loops. For example, current in the left-hand portion of the control loop 51 of register 10 flows to the storage loop 61, and this storage loop has a persistent current therein. The current flowing in the left-hand portion of the control loop 51 to the storage loop 61 divides in inverse proportion to the inductance of the parallel paths, one path of which is defined by the points 61b, 61a, 61d and 61c the other path of which is defined by the points 61b and 61c. The major portion of the current supplied to the left-hand part of the control loop 51 flows through that portion of the storage loop 61 defined by the points 61b and 61c. A small portion of the current supplied to the left part of the control loop 51 flows in that portion of the storage loop 61 defined by the points 61b, 61a, 61d and 61c. The persistent current in the loop 61 is established in a direction to oppose the applied current in the left-hand portion of the control loop 51 in that portion of the storage loop 61 defined by the points 61b and 61c. The applied current flowing in the left-hand portion of the control loop 51 aids the persistent current in that portion of the storage loop defined by the points 61b, 61a, 61d and 61c. The amplitude of the total current flowing in that portion of the storage loop 61b, 61a, 61d and 61c is substantially equal to the amplitude of the applied current flowing in the left-hand portion of the control loop 51. The amplitude of current flowing in that portion of the storage loop 61 defined by the points 61b and 61c is substantially zero.

Considering another example, current in the left-hand portion of the control loop 52 is applied to the storage loop 62. The storage loop 62 has no current circulating therein. Accordingly, the applied current divides in inverse proportion to the inductance of the parallel paths of the loop 62. The smaller portion of the applied current flows in the path defined by the points 62b, 62a, 62d and 62c. The larger portion of the applied current flows in the parallel path defined by the points 62b and 62c. The sum of the two currents leaving the point 62c is equal to the applied current.

A current is applied at this time to the write line 18, and this drives the gates of the cryotrons 41 through 46 resistive. Because the gate of the cryotron 41 is driven resistive, all of the applied current flowing in the left-hand portion of the control loop 51 is diverted through that portion of the storage loop 61 defined by the points 61b, 61a, 61d and 61c. The resistive gate of the cryotron 42 diverts the applied current in the left-hand portion of the control loop 52 through the storage loop 62 defined by the points 62b, 62a, 62d and 62c associated with a loop number. No current flows in the left-hand portion of the control loop 53, and a resistive gate of the cryotron 43 dissipates the circulating current which previously persisted in the storage loop 63. The resistive gate of the cryotron 44 diverts the applied current in the right-hand portion of the control loop 93 through that portion of the storage loop 103 defined by the points a, b, c and d associated with the loop number. No current flows in the right-hand portion of the control loop 92, and the resistive gate of the cryotron 45 dissipates the persistent current which previously flowed in the storage loop 102.

The resistive gate of the cryotron 46 diverts current flowing in the right-hand portion of the control loop 91 to that portion of the storage loop 101 defined by the points a, b, c and d associated with the loop number. At this point current on the write line 18 may be terminated, and upon such occurrence the gates of the cryotrons 41 through 45 become superconductive. The currents in the storage loops continue to flow in the paths through which they were diverted even though an alternate superconductive path is made available when the gates of the cryotrons 41 through 46 revert to their superconductive state. This is true because current established in one of two superconductive paths continues in that path unless forced to change.

At this point the currents applied to the terminals 121 through 123 of register 10 may be terminated, and upon such termination, persistent currents are established in storage loops 61 and 62 of register 10 and in storage loops 101 and 103 of register 12. No persistent current is established in the storage loop 63 of register 10 and storage loop 102 of register 12. Thus it is seen that the binary word 110 is stored in register 10, and the binary word 101 is stored in register 12. The information formerly held in register 12 is now stored in register 10. and the information formerly held in register 10 is now stored in register 12. Accordingly, it is seen that the exchange or swap operation transfers the contents of register 10 to register 12 simultaneously as the contents of register 12 are transferred to register 10.

In practice the inductance of the sense loops is made smaller than that of the control loops. To illustrate more specifically with the control loop 51, the inductance of that portion of the control loop 51 defined by the points 71a, 51b, 51a, 51d, 51c and 71e should be greater than the inductance of that portion of the sense loop 71 defined by the points 71a, 71b, 71c, 71d and 71e. These portions of the loops 51 and 71 represent alternate current paths when current is flowing in the legs 51b and 51c of the control loop 51 at the instant the gate of cryotron 31 is driven resistive by a current on the read line 16 and the gate of the cryotron 81 is superconductive. In such case current is supposed to be diverted around that portion of the sense loop 71 defined by the points 71a, 71b, 71c and 71d, and it will always be so diverted if the inductance of that portion 71a through 71d of the sense loop 71 is much smaller than the inductance of that portion of the control loop 51 defined by the points 71a, 51b, 51a, 51d, 51c and 71e. Since current divides inversely in proportion to the inductances of these two alternate superconductive paths, most of the current from the terminal 121 flows in the sense loop which is the intended path under the above assumed conditions. The schematic arrangement of loops illustrated through the drawings is not presumed to represent dimensions of a physical embodiment as evidenced by the explanation of the foregoing considerations concerning the ratio of inductances in the control loop 51 and the transfer loop 71.

In large scale memory devices it is desirable to be able to transfer the contents of a selected register in one portion of the memory device to a selected register, to all of the registers or to any combination of the registers in another portion of the memory device. A memory device which may perform in this fashion is illustrated in FIGS. 5 and 6.

Figure 7:
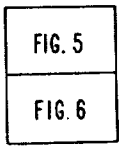
FIG. 7 indicates the manner in which FIGS. 5 and 6 should be arranged.
Figure 5:
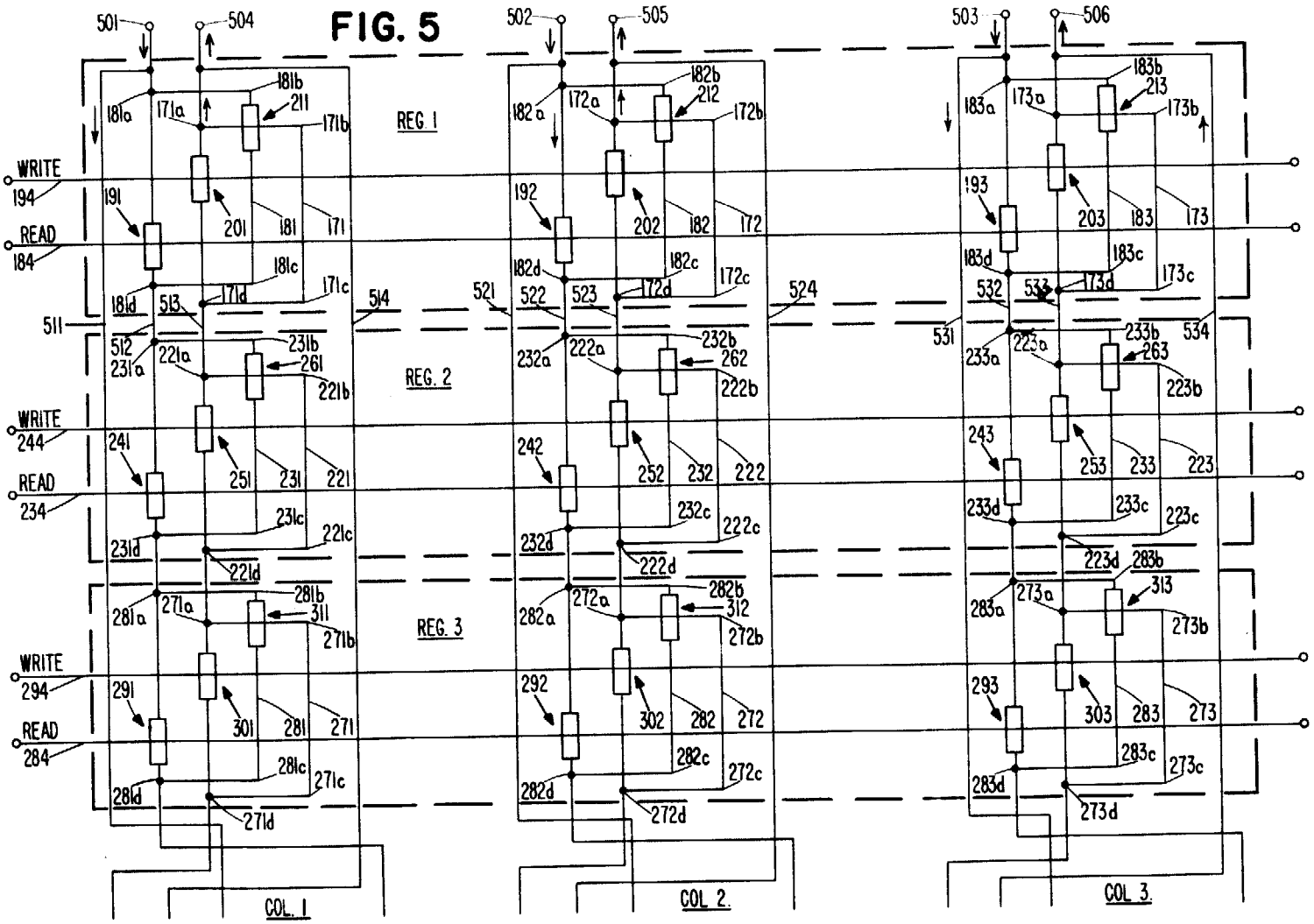
FIGS. 5 and 6 illustrate another arrangement of a memory device constructed according to this invention.
Figure 6:
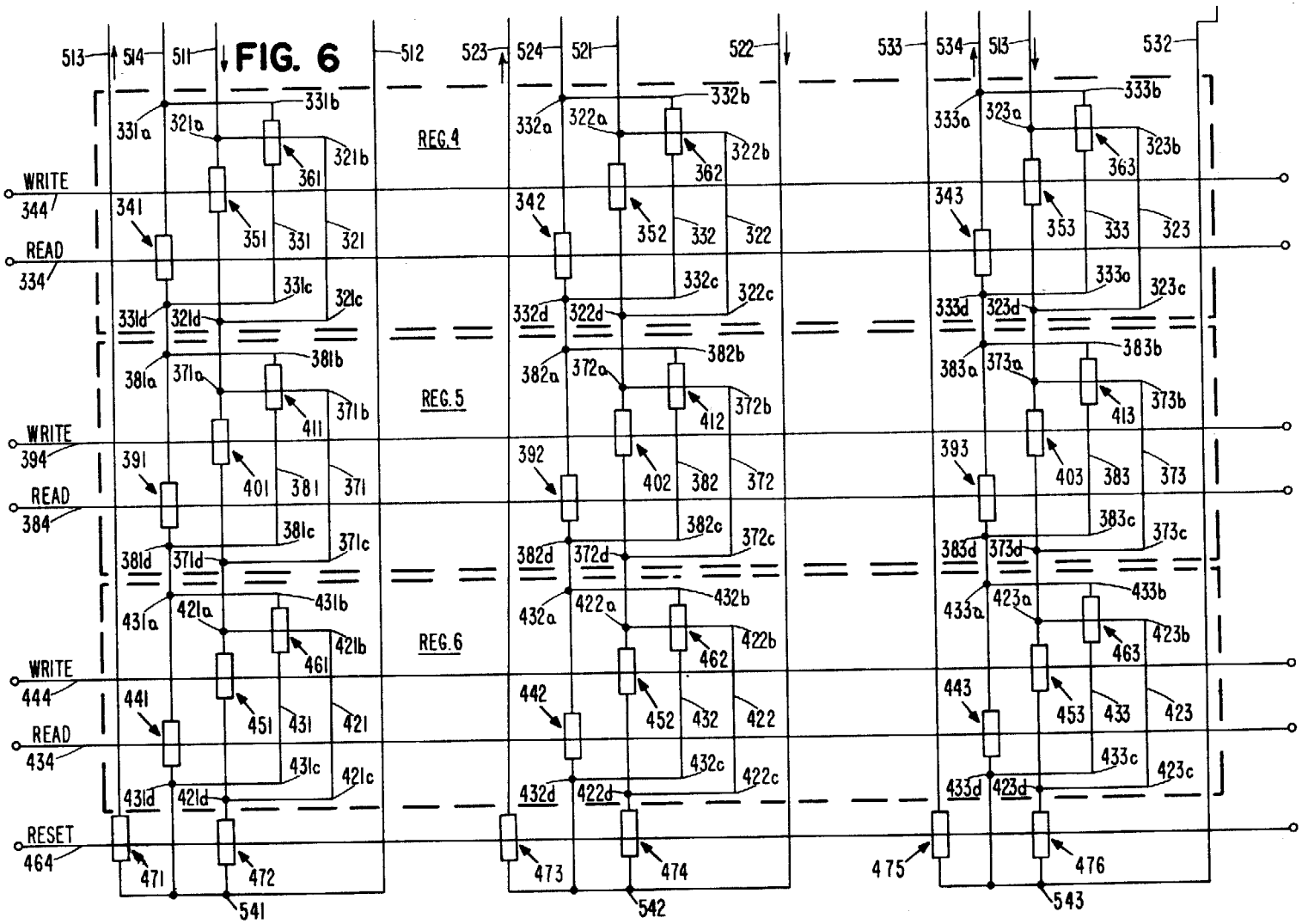

Referring next to FIGS. 5 and 6, registers 1 through 6 are illustrated. FIG. 5 should be disposed above FIG. 6 as indicated in FIG. 7. Registers 1 through 6 are shown with three storage positions each, but it is understood that the number of registers as well as the number of storage positions in each register may be increased or diminished as desired. Register 1 includes storage loops 171 through 173 associated with respective sense loops 181 through 183, and each of these loops is defined by the points a, b, c and d associated with the loop number. Whenever a read operation takes place in register 1, a read line 184 is energized with a current, and this drives the gates of cryotrons 191 through 193 resistive. Whenever a write operation takes place in register 1, a write line 194 is energized with a current, and this drives the gates of cryotrons 201 through 203 resistive. Cryotrons 211 through 213 are disposed in respective sense loops 181 through 183.

Register 2 in FIG. 5 includes storage loops 221 through 223 associated with respective sense loops 231 through 233. Each of these loops is defined by the points a, b, c and d associated with the loop number. When a read operation is performed in register 2, a read line 234 is energized with current, and this drives the gates of cryotrons 241 through 243 resistive. When a write operation takes place in register 2, a write line 244 is energized with current, and this drives the gates of cryotrons 251 through 253 resistive. The sense loops 231 through 233 include respective cryotrons 261 through 263.

Register 3 in FIG. 5 includes storage loops 271 through 273 with associated sense loops 281 through 283. Each of these loops is defined by the points, a, b, c and d associated with the loop number. Whenever a read operation takes place in register 3, a read line 284 is energized with current, and this drives the gates of cryotrons 291 through 293 resistive. Whenever a write operation takes place in register 3, a write line 294 is energized with current, and this drives the gates of cryotrons 301 through 303 resistive. The sense loops 281 through 283 include respective cryotrons 311 through 313 disposed therein.

Register 4 in FIG. 6 includes storage loops 321 through 323 with associated sense loops 331 through 333. Each of these loops is defined by the points a, b, c and d associated with the loop number. Whenever a read operation takes place in register 4, a read line 334 is energized with current, and this drives the gates of cryotrons 341 through 343 resistive. Whenever a write operation takes place in register 4, a write line 344 is energized with current, and this drives the gates of cryotrons 351 through 353 resistive. The sense loops 331 through 333 include respective cryotrons 361 through 363.

The register 5 in FIG. 6 includes storage loops 371 through 373 with associated sense loops 381 through 383. When a read operation takes place in register 5, a read line 384 is energized with current and this drives the gates of cryotrons 391 through 393 resistive. When a write operation takes place in register 5, a write line 394 is energized with current and this drives the gates of cryotrons 401 through 403 resistive. The sense loops 381 through 383 include respective cryotrons 411 through 413.

The register 6 in FIG. 6 includes storage loops 421 through 423 associated with respective sense loops 431 through 433. Each of these loops is defined by the points a, b, c and d associated with the loop number. When a read operation takes place in register 6, a read line 434 is energized with current and this drives the gates of cryotrons 441 through 443 resistive. When a write operation takes place in register 6, a wire line 444 is energized with current and this drives the gates of cryotrons 451 through 453 resistive. Sense loops 431 through 433 includes respective cryotrons 461 through 463. A reset line 464 in FIG. 6 is energized with a current pulse prior to each register exchange operation. A current on the reset line 464 drives the gates of cryotrons 471 through 476 resistive.

Current is supplied to each of the columns 1 through 3 in FIG. 5 through respective input terminals 501 through 503, and current exits from each of these columns through respective terminals 504 through 506. Each of the vertical columns includes four vertical lines. Column 1 includes vertical lines 511 through 514; column 2 includes vertical lines 521 through 524; and column 3 includes vertical lines 531 through 534.

In order to illustrate the register exchange or swap operation in the memory device of FIGS. 5 and 6, let it be assumed that the content of register 1 in FIG. 5 is to be exchanged or swapped with the content of register 4 in FIG. 6. Further, let it be assumed that the binary word 101 is stored in respective columns 1 through 3 of register 1 and that the binary word 110 is stored in respective columns 1 through 3 of register 4. First, currents are applied to terminals 501 through 503 of FIG. 5, and these currents continue for the remainder of the exchange operation. Next, the reset line 464 in FIG. 6 is energized with current, and this drives the gates of the cryotrons 471 through 476 resistive. As a consequence, current from the terminal 501 in FIG. 5 is forced to flow downwardly along the vertical line 512 of column 1 in FIGS. 5 and 6 to the junction point 541 at the bottom of column 1, and this current flows upwardly from the junction point 541 along the vertical line 514 in FIGS. 5 and 6 to the exit terminal 504 at the top of column 1. Considering next column 2, current from the terminal 502 at the top of column 2 flows downwardly along the vertical line 522 in FIGS. 5 and 6 to the junction point 542 at the bottom of column 1 in FIG. 6, and this current flows upwardly from the junction point 542 along the vertical line 524 in FIGS. 5 and 6 to the exit terminal 505 at the top of column 2. In column 3, current applied to the terminal 503 flows downwardly along the vertical line 532 to the junction point 543 at the bottom of column 3 in FIG. 3, and this current flows upwardly from the junction point 543 along the vertical line 534 in FIGS. 5 and 6 to the exit terminal 506 at the top of column 3. At this point current on the reset line 464 is terminated.

A current is applied to the read line 184 in FIG. 5, and this drives the gates of the cryotrons 191 through 193 resistive. A current is applied to the read line 334 in FIG. 6, and this drives the gates of the cryotrons 341 through 343 resistive. Register 1 in FIG. 5 holds the binary word 101 in respective columns 1 through 3.

This information is represented by persistent currents in the storage loops 171 and 173, and no persistent current in the storage loop 172. Register 4 holds the binary word 110 in respective columns 1 through 3. This information is represented by persistent currents in the storage loops 321 and 322 and no persistent current in the storage loop 323.

In column 1, the gate of the cryotron 191 in register 1 is driven resistive by the current on the line 184, and the gate of the cryotron 211 is driven resistive by the persistent current in the storage loop 171. Consequently, current from the terminal 501 at the top of column 1 is diverted from the vertical line 512 to the vertical line 511. The current flows downwardly along the line 511 through the storage loops 321, 371 and 421 to the junction point 541 at the bottom of column 1 in FIG. 6. The gate of the cryotron 341 in register 4 is driven resistive by the current on the read line 334, and the gate of the cryotron 361 is driven resistive by the persistent current in the storage loop 321. Consequently, current from the junction point 541 is diverted from the vertical line 514 to the vertical line 513. The current flows upwardly through the vertical line 513 through the storage loops 271, 221 and 171 to the exit terminal 504 at the top of column 1.

Considering next what happens in column 2, current from the terminal 502 flowing downwardly in the vertical line 522 is diverted by the resistance of the gate of the cryotron 192 in register 1, and the current flows in the path defined by the points 182a, 182b, 182c and 182d. From the point 182d, the current flows downwardly through the vertical line 522 to the junction point 542. The gate of the cryotron 342 in column 2 of register 4 is driven resistive by the current on the read line 334. The gate of the cryotron 362 in the sense loop 332 of column 2 in register 4 is driven resistive by the persistent current in the storage loop 322. Consequently, current is diverted from the vertical line 524, and it flows from the junction point 542 upwardly along the vertical line 523 through the storage loops 272, 222 and 172 to the exit terminal 505 at the top of column 2.

Considering next what happens in column 3, the gate of the cryotron 193 is driven resistive by the current on the read line 184, and the gate of the cryotron 213 is driven resistive by the present current in the storage loop 173. Consequently, current from the terminal 503 at the top of column 3 is diverted from the vertical line 532 and it flows downwardly along the vertical line 531 through the storage loops 323, 373 and 423 to the junction point 543. The gate of the cryotron 343 is driven resistive by the current on the read line 334, but the gate of the cryotron 363 is superconductive because no persistent current is flowing in the storage loop 323. Thus, the current from the junction point 543 is not diverted from the vertical line 534. The current from the junction point 543 flows upwardly along the vertical line 534 to the sense loop 333. The current is diverted through that portion of the sense loop 333 defined by the points 333d, 333c, 333b and 333a. From the point 333a the current continues upwardly along the vertical line 534 to the exit terminal 506 at the top of column 3. At this point the read currents on the read line 184 of register 1 and the read line 334 of register 4 may be terminated.

A current may be applied to the write line 194 of register 1, and simultaneously a current may be applied to the write line 344 of register 4. Current on the write line 194 of register 1 drives the gates of the cryotrons 201 through 203 resistive. The resistive gate of the cryotron 201 diverts the current flowing upwardly through the vertical line 513 through that portion of the storage loop 171 defined by the points 171d, 171c, 171b and 171a. The resistive gate of the cryotron 202 in column 2 of register 1 diverts the current flowing upwardly in the vertical line 523 through that portion of the storage loop 172 defined by the points 172d, 172c, 172b and 172a. Since no current flows upwardly through the vertical line 533, the storage loop 173 in column 3 of register 1 receives no applied current. Consequently, the resistance of the gate of the cryotron 203 dissipates the persistent current earlier circulating in this storage loop.

Considering next register 4, the current on the write line 344 drives the gates of the cryotrons 351 through 353 resistive. In column 1 of register 4 the current flowing downwardly through the vertical line 511 is diverted by the resistance of the gate 351 through that portion of the storage loop 321 defined by the points 321a, 321b, 321c and 321d. In column 2 of register 4 no current flows downward through the vertical line 521, and no current is applied to the storage loop 322 of register 4. Consequently, the resistive gate of the cryotron 352 dissipates the persistent current earlier circulating in the storage loop 322. In column 3 current flowing downwardly through the vertical line 513 is diverted by the resistance of the gate of the cryotron 353 in register 3 through that portion of the storage loop 323 defined by the points 323a, 323b, 323c and 323d. At this time currents applied to the write lines 194 of register 1 and 344 of register 4 may be terminated. Upon the occurrence of such termination, persistent currents are established in the storage loops 171 and 172 of register 1 and in storage loops 321 and 323 of register 4. Current supplied to the terminals 501 through 503 may be terminated immediately after the write line 194 of register 1 and 344 of register 4. No persistent current is established in the storage loop 173 of register 1 and in the storage loop 322 of register 4. Accordingly, the binary word 110 is represented in respective columns 1 through 3 of register 1, and the binary word 101 is represented in respective columns 1 through 3 of register 4.

It is seen, therefore, that as a result of the exchange or swap operation the binary word 110 previously stored in register 4 is now stored in register 1, and the binary word 101 previously stored in register 1 is now stored in register 4. It is pointed out that the binary word 110 from register 4 may have been written in registers 2 and 3, in the same manner it was written in register 1 by energizing respective write lines 244 and 294. Similarly, the binary word 101 previously held in register 1 may have been written in registers 5 and 6, in the same manner it was written in register 4, by energizing respective write lines 394 and 444. Thus, a word in any one of the registers 1 through 3 may be transferred to any one of the registers 4 through 6 or to any combination of the registers 4 through 6 including all of these registers, and a word in a selected one of the registers 4 through 6 may be transferred simultaneously to any one of the registers 1 through 3 or any combination of the registers 1 through 3 including all of these registers.

No provision is illustrated in the memory device of FIG. 1 or the memory device of FIGS. 5 and 6 for transferring information from registers within the memory to devices external to the memory since such circuits are not necessary for an understanding of this invention. Furthermore, such circuits tend to complicate unnecessarily the circuit arrangements of the present invention. For an illustration and a description of circuits which may be employed to read information from registers within the memory to external devices, as well as for writing techniques or methods using superconductive loops, reference may be made to copending application Serial No. 30,019 for Memory Device filed on May 18, 1960, by Munro K. Haynes and assigned to the assignee of this invention.

While the invention has been illustrated and described in certain arrangements, it is recognized that variations and changes may be made therein without departing from the invention as set forth in the claims.

What is claimed is:

1. A memory device including a plurality of registers each of which has a plurality of stages, means coupled to each register for writing information in parallel into all of the stages therein, means coupled to each register for reading information in parallel from all of the stages therefrom and means coupled to each register which is operative in conjunction with the means for writing and the means for reading to transfer information in parallel from all of the stages of a selected first register to a selected second register simultaneously as information in the selected second register is transferred to the selected first register without requiring information transfer to a device external to the memory device.

2. A memory device including at least two registers each of which has a plurality of stages, first means coupled to each register for writing information in parallel into all of the stages therein, second means coupled to each register for reading information in parallel from all of the stages therefrom, third means coupled to each register which operates in conjunction with the first and second means to transfer information in parallel from all of the stages of a selected first register to a selected second register simultaneously as information in the selected second register is transferred to the selected first register without requiring information transfer to a device external to the memory device.

3. The apparatus of claim 2 wherein the memory device is constructed from cryogenic devices.

4. The apparatus of claim 3 wherein the cryogenic devices are cryotrons.

5. A memory device including a first group of plural stage registers and a second group of plural stage registers, first means coupled to each register of the first and second groups for writing information in parallel into all of the stages therein, second means coupled to each register of the first and second groups for reading information in parallel from all of the stages therefrom, and third means coupled to each register of the first and second groups which is operated with the first and second means to transfer information in parallel from all of the stages of a selected first register to a selected second register simultaneously as information in the selected second register is transferred to the selected first register without requiring information transfer to a device external to the memory device.

6. The apparatus of claim 5 wherein the memory device is constructed from cryogenic devices.

7. The apparatus of claim 6 wherein the cryogenic devices are cryotrons.

8. A memory device having a plurality of registers each of which has a plurality of stages in which information may be stored, first means coupled to each register for reading information in parallel from all of the stages therefrom or writing information in parallel into all of the stages therein, and second means coupled to each register which operates with the first means to transfer information in parallel from all of the stages of a selected first register to a selected second register simultaneously as information in the selected second register is transferred to the selected first register without requiring information transfer to a device external to the memory device.

9. The apparatus of claim 8 wherein the memory device is constructed from cryogenic devices.

10. A memory device having a plurality of registers each of which has a plurality of stages, each of said stages including cryotrons interconnected to provide a control loop and a storage loop, means interconnecting each of the storage loops for effecting the establishment of a persistent current therein for reading information into the registers, means connected with the control loops for controlling the reading of information in parallel from all of the stages of the registers, and circuit means including cryotrons interconnecting said registers which is operative in conjunction with the first and second recited means to transfer information in parallel from all of the stages of a selected first register to a selected second register simultaneously as information in the selected second register is transferred to the selected first register without requiring information transfer to a device external to the memory device.

11. A memory device including a first group of registers and a second group of registers, each of said group of registers including a plurality of stages in which information may be stored, each of said stages including a plurality of cryotrons arranged to provide a sense circuit and a storage circuit, first means coupled to each stage of each register of the first and second groups for writing information in parallel into all of the stages therein, second means coupled to each stage of each register of the first and second groups for reading information in parallel from all of the stages therefrom, and third means coupled to each register of the first and second groups and operated with the first and second means to transfer information in parallel from all of the stages of a selected first register to a selected second register simultaneously as information in the selected second register is transferred to the selected first register without requiring information transfer to a device external to the memory device.

12. The memory device as defined in claim 11 wherein said third means is arranged to transfer information in parallel from all of the stages of a selected register in the first group to a selected register in the second group and for simultaneously transferring information in parallel from all of the stages in the selected register of the second group to any one or more of the registers of the first group.

13. A memory device including first and second registers, means coupled to each register for writing information therein, means coupled to each register for reading information therefrom, and means coupled to each register operative in conjunction with the means for writing and the means for reading to transfer first information from the first register in the memory device to the second register in the memory device and for simultaneously transferring second information in the second register of the memory device to the first register of the memory device, whereby a simultaneous exchange of different information is accomplished between the registers without requiring information transfer to a device external to the memory device.

14. A memory device including first and second plural stage registers, means coupled to each register for writing information in parallel into all of the stages, means coupled to each register for reading information in parallel from all of the stages, and means coupled to each register operative in conjunction with the means for writing and the means for reading to transfer first information in parallel from all of the stages of the first register in the memory device to the second register in the memory device and for simultaneously transferring second information in parallel from all of the stages in the second register to the memory device to the first register of the memory device, whereby a simultaneous parallel exchange of different information is accomplished between the registers without requiring information transfer to a device external to the memory device.

*15. A memory device including a plurality of registers each of which has a plurality of stages, means coupled to each register for writing information in parallel into all of the stages therein, means coupled to each register for reading information in parallel from all of the stages therefrom and means coupled to each register which is operative in conjunction with the means for writing and the means for reading to transfer information in parallel from all of the stages of selected first register to a selected second register simultaneously as information is trans-*

*ferred from the selected second register without requiring information transfer to a device external to the memory device.*

*16. A memory device having a plurality of registers each of which has a plurality of stages in which information may be stored, first means coupled to each register for reading information in parallel from all of the stages therefrom or writing information in parallel into all of the stages therein, and second means coupled to each register which operates with the first means to transfer information in parallel from all of the stages of a selected first register to a selected second register simultaneously as information is transferred from the selected second register without requiring information transfer to a device external to the memory device.*

References Cited

The following references, cited by the Examiner, are of record in the patented file of this patent or the original patent.

UNITED STATES PATENTS

| | | | |
|---|---|---|---|
| 2,902,217 | 9/1959 | Davis | 340—172.5 |
| 2,911,622 | 11/1959 | Ayres | 340—172.5 |
| 2,954,166 | 9/1960 | Echdahl | 235—167 X |
| 2,978,685 | 4/1961 | Echdahl | 235—167 X |
| 3,019,353 | 1/1962 | Mackay | 340—173.1 |
| 3,019,354 | 1/1962 | Anderson | 340—173.1 |
| 3,114,137 | 12/1963 | Morgan | 340—174 |

TERRELL W. FEARS, *Primary Examiner.*